United States Patent
Lai

(10) Patent No.: US 8,423,802 B2
(45) Date of Patent: Apr. 16, 2013

(54) POWER SCALING MODULE AND POWER SCALING UNIT OF AN ELECTRONIC SYSTEM HAVING A FUNCTION UNIT IN A STANDBY STATE WHICH IS INSENSITIVE TO CHANGE IN FREQUENCY OR VOLTAGE DURING SYNCHRONIZATION

(75) Inventor: Chi-Chang Lai, Hsinchu County (TW)

(73) Assignee: Andes Technology Corporation, Hsin-Chu (TW)

( * ) Notice: Subject to any disclaimer, the term of this patent is extended or adjusted under 35 U.S.C. 154(b) by 317 days.

(21) Appl. No.: 12/755,425

(22) Filed: Apr. 7, 2010

(65) Prior Publication Data

US 2011/0252245 A1 Oct. 13, 2011

(51) Int. Cl.
*G06F 1/26* (2006.01)

(52) U.S. Cl.
USPC .......................................... 713/300; 713/320

(58) Field of Classification Search .................. 713/300, 713/320
See application file for complete search history.

(56) References Cited

U.S. PATENT DOCUMENTS

| | | | |
|---|---|---|---|
| 5,560,022 A | 9/1996 | Dunstan et al. | |
| 5,745,375 A | 4/1998 | Reinhardt et al. | |
| 6,704,877 B2 * | 3/2004 | Cline et al. | 713/320 |
| 6,990,594 B2 * | 1/2006 | Kim | 713/322 |
| 7,080,267 B2 * | 7/2006 | Gary et al. | 713/300 |
| 7,085,944 B1 * | 8/2006 | Hamilton | 713/320 |
| 7,100,061 B2 | 8/2006 | Halepete et al. | |
| 7,155,617 B2 * | 12/2006 | Gary et al. | 713/300 |
| 7,174,468 B2 * | 2/2007 | Gary et al. | 713/300 |
| 7,272,730 B1 * | 9/2007 | Acquaviva et al. | 713/300 |
| 7,657,764 B2 * | 2/2010 | Jorgenson et al. | 713/300 |
| 7,770,034 B2 * | 8/2010 | Nanja | 713/300 |
| 7,930,577 B2 * | 4/2011 | Meijer et al. | 713/340 |
| 8,069,355 B2 * | 11/2011 | Simeral et al. | 713/300 |
| 8,127,160 B2 * | 2/2012 | Bieswanger et al. | 713/321 |
| 2002/0133729 A1 * | 9/2002 | Therien et al. | 713/330 |
| 2007/0288778 A1 * | 12/2007 | Zhuang et al. | 713/320 |
| 2008/0010473 A1 | 1/2008 | Harris | |
| 2009/0150689 A1 * | 6/2009 | Simeral et al. | 713/300 |
| 2010/0037038 A1 * | 2/2010 | Bieswanger et al. | 712/220 |
| 2010/0162018 A1 * | 6/2010 | Subramanian et al. | 713/322 |
| 2011/0083021 A1 * | 4/2011 | Floyd et al. | 713/300 |

* cited by examiner

*Primary Examiner* — Thomas Lee
*Assistant Examiner* — Robert Cassity
(74) *Attorney, Agent, or Firm* — Jianq Chyun IP Office

(57) ABSTRACT

A power scaling unit (PSU) of an electronic system is provided. The PSU includes a software programming interface (SPI) and a PSM. The SPI receives a transaction through software programming. The PSM receives the transaction from the SPI and controls a power driving element (PDE) of the electronic system to change an output of the PDE provided to a function unit of the electronic system according to the transaction. The output of the PDE is an operating voltage or an operating clock signal of the function unit. The transaction includes a command defining a power scaling operation to be performed by the PSM, a parameter used by the operation, and an event mask specifying an event which triggers the operation.

16 Claims, 7 Drawing Sheets

POWER SCALING MODULE AND POWER SCALING UNIT OF AN ELECTRONIC SYSTEM HAVING A FUNCTION UNIT IN A STANDBY STATE WHICH IS INSENSITIVE TO CHANGE IN FREQUENCY OR VOLTAGE DURING SYNCHRONIZATION

BACKGROUND OF THE INVENTION

1. Field of the Invention

The present invention relates to power management of an electronic system. More particularly, the present invention relates to a power scaling unit and its power scaling modules of an electronic system.

2. Description of the Related Art

Power scaling is the procedure to change computation power consumed by an electronic system by changing operating frequency or operating voltage of the components of the electronic system. Power scaling is for trading off of performance/feature and power consumption. Data-processing electronic systems, such as personal computers, are becoming more complex in design and architecture, while expected power consumption of such electronic systems is getting lower. Consequently, power management of electronic systems is getting more complex and more demanding as well.

In such a trend, power scaling has to be used strictly and smartly. Nowadays an electronic system may include multiple power domains. Each power domain may be driven by different operating frequencies and/or operating voltages. The electronic device may execute several applications at the same time. Ideally, each of the applications has a corresponding power profile recording the power scaling applied to the power domains when the particular application is running. When the applications go through context switch, their power profiles have to be switched as well. The switching of power profiles may cause extensive change of power scaling conditions across the power domains. In such an electronic system, there is a need for a scalable power scaling mechanism which provides fine-grained power control and smooth transition of power states in the entire electronic system according to application activities.

SUMMARY OF THE INVENTION

Accordingly, the present invention is directed to a power scaling unit (PSU) of an electronic system, which is capable of providing fine-grained power control and smooth transition of power states in the entire electronic system according to application activities.

The present invention is also directed to a power scaling module (PSM) of the PSU. The PSM provides the power management functions of the PSU.

According to an embodiment of the present invention, a PSU of an electronic system is provided. The PSU includes a software programming interface (SPI) and a PSM. The SPI receives a transaction through software programming. The PSM receives the transaction from the SPI and controls a power driving element (PDE) of the electronic system to change an output of the PDE provided to a function unit of the electronic system according to the transaction. The output of the PDE is an operating voltage or an operating clock signal of the function unit. The transaction includes a command defining an operation, a parameter used by the operation, and an event mask specifying an event which triggers the operation. When the command defines a power-down operation, the PSM turns off the output of the PDE and enters an off state. The event triggers the PSM to wake up out of the off state and turns on the output of the PDE according to the parameter. When the command defines an instant scaling operation, the PSM changes the operating voltage or the frequency of the operating clock signal according to the parameter.

The PSM may include a plurality of programmable registers, a PDE-independent logic circuit, and a PDE-dependent logic circuit. The programmable registers are coupled to the SPI for storing the command, the parameter, and the event mask. The PDE-independent logic circuit is coupled to the programmable registers for performing the operation defined by the command according to the parameter. The PDE-independent logic circuit also receives the event. The PDE-dependent logic circuit is coupled to the PDE-independent logic circuit for generating signals to control the PDE.

When the command defines an event-driven scaling operation, the PSM waits for the event and then changes the operating voltage or the frequency of the operating clock signal according to the parameter.

According to the parameter, the PSM may reset the function unit after the PSM changes the output of the PDE.

The transaction may further include a synchronization instruction. The synchronization instruction specifies a synchronization handshaking between the PSM and the function unit during the operation defined by the command. During the synchronization handshaking, the function unit enters a standby state, and then the PSM changes the output of the PDE, and then the function unit resumes normal operation. The function unit is insensitive to the change of the output of the PDE in the standby state.

The PSU may include more than one PSM. In this case, the transaction may further include a synchronization instruction specifying a synchronization handshaking between the PSM and another PSM of the PSU during the operation defined by the command. The PSM and the other PSM may perform this synchronization handshaking right before the former PSM changes the output of the PDE, right before the former PSM performs the aforementioned synchronization handshaking with the function unit, and/or right before the former PSM finishes the aforementioned synchronization handshaking with the function unit.

When a PSM is in the off state, a non-maskable power-on event may trigger the PSM to wake up out of the off state and turns on the output of the PDE according to a predetermined parameter. In addition, a non-maskable power failure event may trigger the PSM to change the output of the PDE according to the same predetermined parameter or another predetermined parameter regardless of the current state of the PSM.

The PSU may include a plurality of PSMs and a batch scaling module (BSM). The BSM controls the performing of a sequential transaction batch or a parallel transaction batch. The sequential transaction batch includes a plurality of transactions to be performed by the PSMs sequentially, while the parallel transaction batch includes a plurality of transactions to be performed by the PSMs in parallel. The BSM triggers each of the PSMs to perform the corresponding transaction according to a sequence specified in a chaining information of the sequential transaction batch. The chaining information is received through the SPI and is stored in either the BSM or the PSMs.

Each one of the transactions of the sequential transaction batch may be another parallel transaction batch. Similarly, each one of the transactions of the parallel transaction batch may be another sequential transaction batch.

According to another embodiment of the present invention, a PSM of an electronic system is provided. This PSM is the same as the aforementioned PSMs of the aforementioned PSU. The programmable registers of the PSM stores a command, a parameter, and an event mask of a transaction received through software programming. The PDE-independent logic circuit of the PSM is coupled to the programmable registers for controlling a PDE of the electronic system to change an output of the PDE provided to a function unit of the electronic system according to the transaction. When the command defines a power-down operation, the PDE-independent logic circuit turns off the output of the PDE and enters an off state. The event triggers the PDE-independent logic circuit to wake up out of the off state and turns on the output of the PDE according to the parameter. When the command defines an instant scaling operation, the PDE-independent logic circuit changes the operating voltage or the frequency of the operating clock signal according to the parameter. The PDE-dependent logic circuit of the PSM is coupled to the PDE-independent logic circuit for generating signals to control the PDE.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
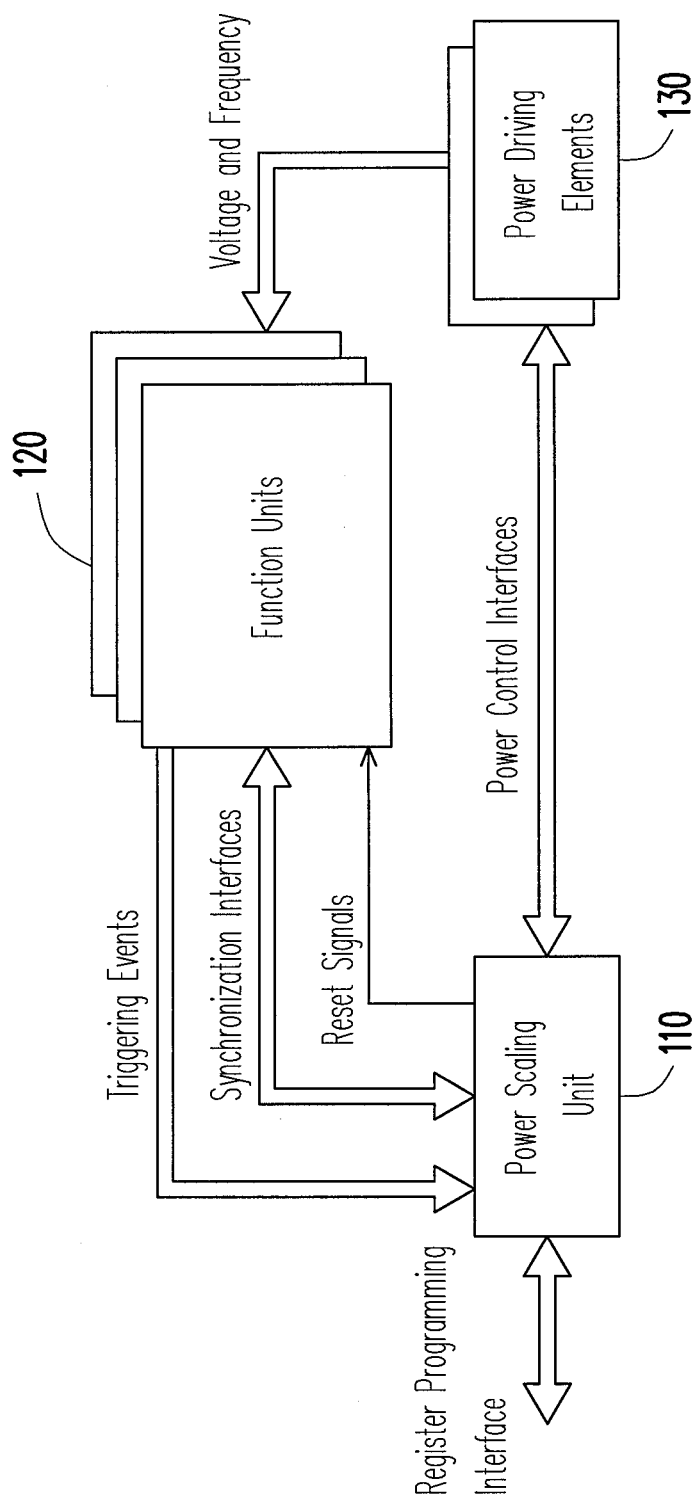
FIG. 1 is a block diagram showing an electronic system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram showing an electronic system 100 according to an embodiment of the present invention. The electronic system 100 includes a PSU 110, one or more function units 120, and one or more PDEs 130. Each function unit 120 may be a programmable data processing engine which executes sequences of commands or instructions continuously, such as central processing unit (CPU), digital signal processor (DSP), or coprocessor. In addition, each function unit 120 may be a peripheral device like real-time clock (RTC), timer, direct memory access (DMA) controller, or connectivity controllers like Ethernet Media Access Control (MAC) sublayer controller or Universal Serial Bus (USB) controller. Each PDE 130 may be an element that generates or drives the operating clock signal, namely the frequency of the operating clock signal, of one or more function units 120. Alternatively, each PDE 130 may be an element that supplies operating voltage to one or more function units 120. A PDE that provides operating frequency may be a phase-locked loop (PLL), delay-locked loop (DLL), clock divider, or clock gating cell, etc. A PDE that provides operating voltage may be a regulator, converter, transformer, or battery, etc.

Figure 2:
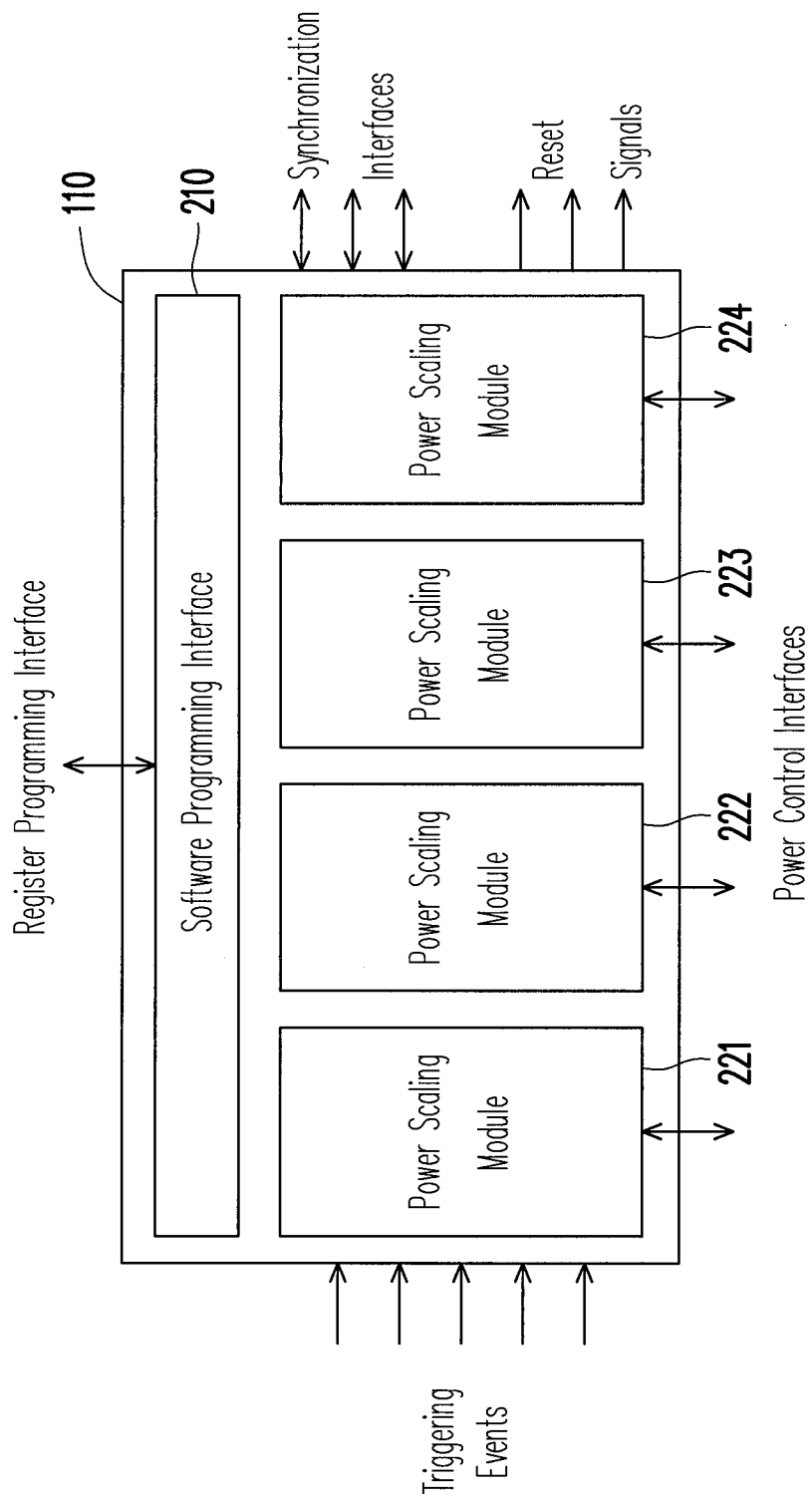
FIG. 2 is a block diagram showing the power scaling unit in FIG. 1.
Figure 3:
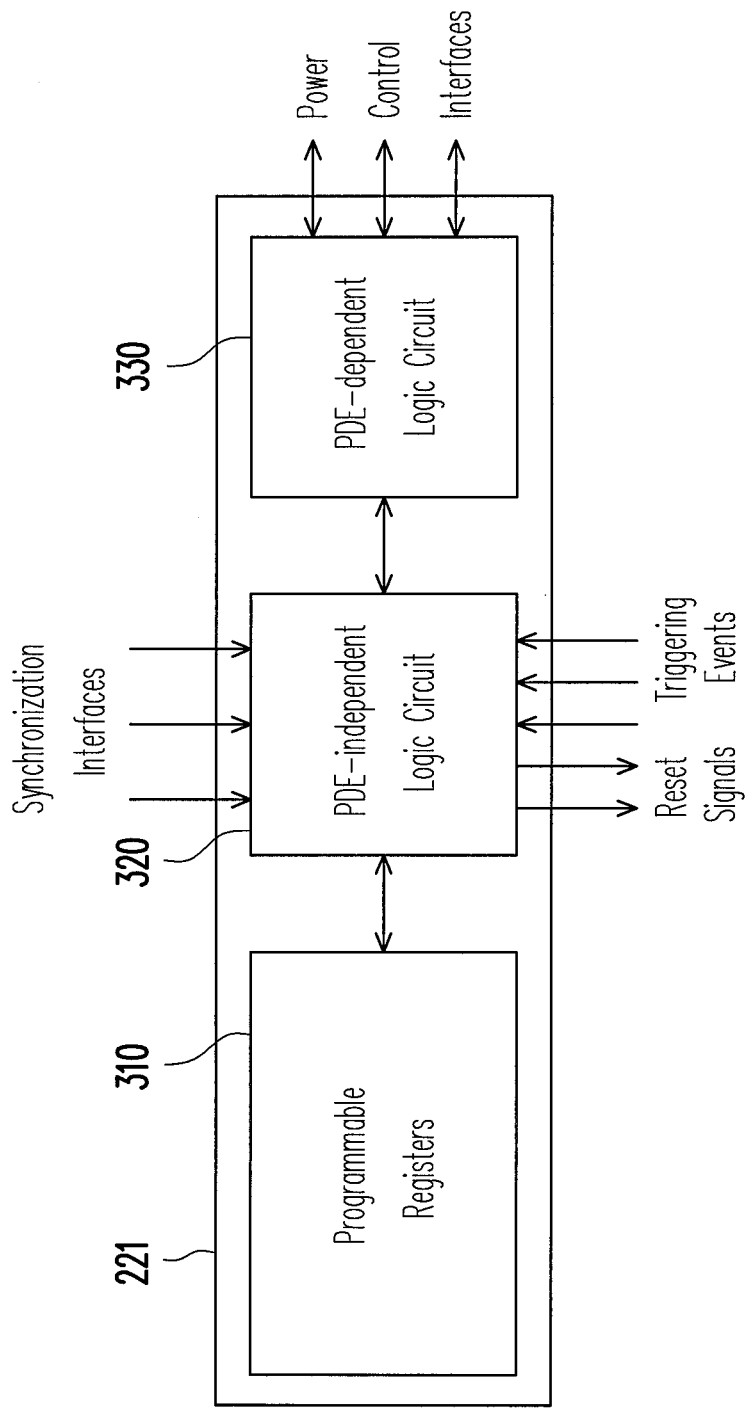
FIG. 3 is a block diagram showing one of the power scaling modules in FIG. 2.

FIG. 2 is a block diagram showing the PSU 110 in FIG. 1. The PSU 110 includes an SPI 210 and four PSMs 221-224. In the other embodiments of the present invention, the PSU 110 may include more or less PSMs. Each PSM 221-224 is identical in design and function, except for the PDE-dependent logic circuits which are discussed later. Each PSM 221-224 controls one or more PDEs 130. In other words, the PSM 221-224 control the operating frequency and operating voltage of the function units 120 through the PDEs 130. Take the PSM 221 for example. FIG. 3 is a block diagram showing the PSM 221 in FIG. 2. The PSM 221 includes a plurality of programmable registers 310, a PDE-independent logic circuit 320 coupled to the programmable registers 310, and a PDE-dependent logic circuit 330 coupled to the PDE-independent logic circuit 320.

The SPI 210 provides a register programming interface. Through this register programming interface, software in the electronic system 100 can assign power scaling transactions ("transactions" for brevity) to the PSMs 221-224. Status of the PSM 221-224 and results of the transactions may be obtained from the PSM 221-224 through the register programming interface.

The PDE-independent logic circuit 320 includes a hardware synchronization interface to synchronize with the function units 120 or the other PSMs in the PSU 110 during the transactions. The PDE-independent logic circuit 320 also receives event signals ("events" for brevity) from the function units 120. Some transactions may depend on specific events. The events trigger the progress of such transactions. In some transactions, a PSM may send a hardware reset signal to reset one or more function units 120. This hardware reset is usually used when a function unit 120 requires a known state restart after a change of operating frequency or operating voltage.

The PDE-dependent logic circuit 330 includes a power control interface for controlling the corresponding PDEs 130. The power control interface may generate or drive primitive control signals to control the PDEs 130. The power control interface may be a known, standard interface, such as the Power Management Bus (PMBus).

The SPI 210 receives transactions through software programming. Here software programming means reading or writing the programmable registers of a PSM 221-224. A transaction for power scaling is issued by software in the electronic system 100 through the SPI 210 to one of the PSMs 221-224. A transaction may include a command, one or more parameters, a synchronization instruction, and/or an event mask, which may be programmed by software in the electronic system 100 through the register programming interface provided by the SPI 210. The command defines an operation to be performed by the PSM. The parameters are used by the operation defined by the associated command. The synchronization instruction specifies required synchronization handshaking during the operation. The event masks determine the dependency of the operation on triggering event inputs. The event masks inform the PSM to observe which events and to block which events. The command, the parameters, the synchronization instruction, and the event masks of the transaction are all stored in the programmable registers of the PSM that receives the transaction. The programmable registers also store the status of the PSM and the results of the transaction, which may be obtained by software through the SPI 210.

The PDE-independent logic circuit 320 is the core component of a PSM. The PDE-independent logic circuit 320 performs power scaling transactions. The PDE-independent logic circuit 320 controls the associated PDEs 130 through the PDE-dependent logic circuit 330 to change the operating voltage and/or the frequency of the operating clock signal provided by the PDEs 130 to the function units 120 according to the command and parameters of the transaction. In addition, the PDE-independent logic circuit 320 performs the synchronization handshaking of the PSM according to the synchronization instruction. The PDE-independent logic circuit 320 observes events sent by the function units 120 and controls the progress of the power scaling operation accordingly. When the parameters specify that hardware reset is necessary, the PDE-independent logic circuit 320 sends signals to reset one or more function units 120 according to the parameters after the PDE-independent logic circuit 320 changes the output of the PDEs 130.

In this embodiment, there are three kinds of power scaling operations which may be defined by the command of a transaction, namely, power-down operation, instant scaling operation and event-driven scaling operation. These operations are discussed in details below.

When the command defines a power-down operation, the PDE-independent logic circuit 320 turns off the output of one or more PDEs 130 and enters an off state to wait for one or more events whose event masks are de-asserted in the transaction. When anyone of the aforementioned events is observed, the PDE-independent logic circuit 320 wakes up out of the off state and turns on the output of the PDEs 130. The triggering event may be specified by de-asserting the corresponding event mask. The PDE-independent logic circuit 320 simply blocks and ignores the events whose corresponding event masks are asserted. The parameters of the transaction may specify which output voltages and/or clock signals of which PDEs 130 are to be turned on after the PDE-independent logic circuit 320 wakes up out of the off state. The parameters of the transaction may also specify how the PDE-independent logic circuit 320 turns on the output of the PDEs 130. After waking up, the PDE-independent logic circuit 320 may resume the output of a PDE to the state right before turning off or change the output of the PDE according to the parameter.

When the command defines an instant scaling operation, the PDE-independent logic circuit 320 changes the operating voltage and/or the frequency of the operating clock signal provided by one or more PDEs 130 according to the parameter instantly and unconditionally, without waiting for any event.

When the command defines an event-driven scaling operation, the PDE-independent logic circuit 320 waits for one or more events specified by the event masks. When anyone of the specified events is observed, the PDE-independent logic circuit 320 proceeds to change the operating voltages and/or the frequencies of the operating clock signals output by one or more PDEs 130 according to the parameters of the transaction. The event-driven scaling operation is very similar to the instant scaling operation. The difference is that an event-driven scaling operation is deferred until at least one triggering event is observed by the PDE-independent logic circuit 320, while an instant scaling operation starts immediately without waiting for any event.

The parameters associated with an instant scaling operation or an event-driven scaling operation may be used as absolute control values for corresponding PDEs or as relative control values for the PDEs.

For example, a PDE outputting an operating voltage may provide choices of multiple voltage steps, such as 1.2V, 1.1V, 1V, 0.9V and 0.8V. In this example, the values of the parameter may be as simple as "stepping-down" and "stepping-up". For another example, a PDE may be a clock frequency divider which provides operating frequency to one or more function units 120. This PDE may provide choices of many frequency ratios, such as 2:1, 3:1, 4:1 and 8:1. In this example, the values of the parameter may be simply "divide-by-2", "divide-by-3", "multiply-by-2" or "multiply-by-3".

After the PDE-independent logic circuit 320 changes the output of a corresponding PDE 130, the PDE-independent logic circuit 320 waits for the PDE 130 to stabilize. The PDE-independent logic circuit 320 may wait for a stabilization result sent by the PDE 130 or wait for a predetermined PDE stabilization time span.

For each event in a transaction, the choices of positive edge trigger or negative edge trigger, high level trigger or low level trigger, and the assertion or de-assertion of event masks, are all programmable by software in the electronic system 100. There are also non-maskable events which have no corresponding event masks. Non-maskable events cannot be blocked. Non-maskable events can trigger the PSU 110 to perform non-programmable operations, which may not be disabled by software by accident. In this embodiment, the PSU 110 responds to two non-maskable events, namely, the power-on event and the power failure event.

When the PSU 110 receives a power-on event, at least one PSM 221-224 of the PSU 110 will perform wakeup operation if it is in the off state. The wakeup operation is similar to the part of a power-down operation after the triggering event is observed. When the PSM is in the off state, the non-maskable power-on event triggers the PSM to wake up out of the off state and turns on the output of one or more PDEs 130 according to a predetermined non-programmable set of wakeup parameters. These parameters specify how the PSM controls the output of the PDEs 130 after waking up.

The aforementioned power failure event is used to indicate an unexpected power failure just happened in the electronic system 100. The power failure event enables the PSU 110 to perform predetermined power failure fault handling, such as resuming one or more predetermined power-domains. When the power failure event is observed by the PSU 110, the PSU 110 may have at least one PSM 221-224 to perform wakeup operation regardless of the current state of the PSM. The non-maskable power failure event triggers the PSM to change the output of one or more PDEs 130 according to predetermined wakeup parameters.

The power-on event and the power failure event may use the same predetermined non-programmable set of wakeup parameters. Alternatively, the power-on event and the power failure event may use separate predetermined sets of wakeup parameters. There may be multiple power-on events and multiple power failure events for waking up different power domains.

Figure 4:
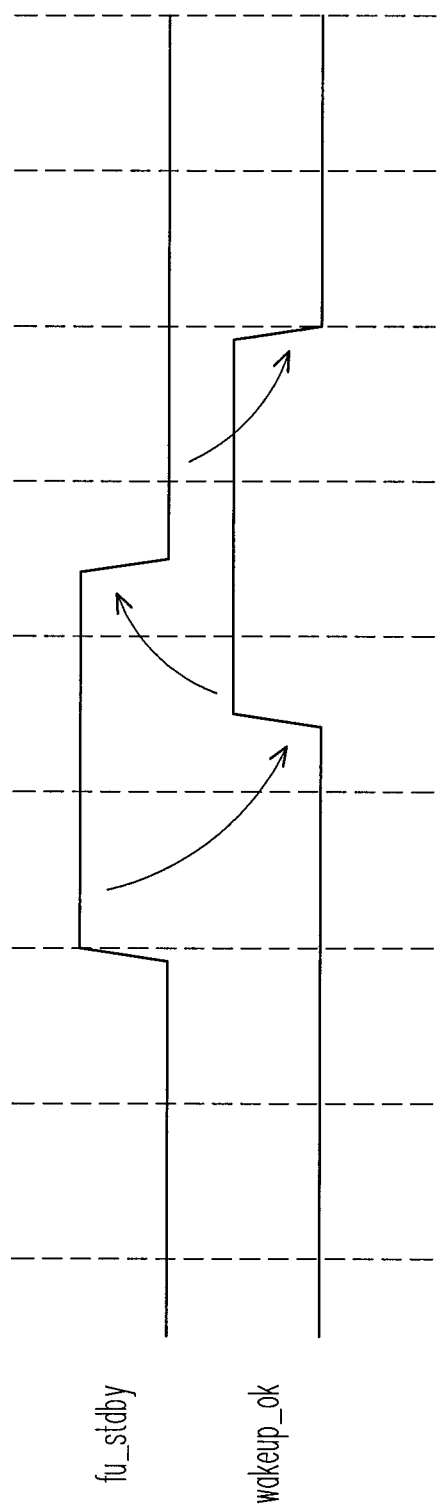
FIG. 4 is a timing diagram illustrating a synchronization handshaking between a power scaling module in FIG. 2 and a function unit in FIG. 1.

The power scaling transaction may include a synchronization instruction. The synchronization instruction may specify the required synchronization handshaking between a PSM 221-224 and one or more function units 120 during the operation defined by the command of the transaction. In this embodiment, a PSM performs synchronization handshaking with a function unit 120 at most once during a power scaling transaction. More such synchronization handshaking during a transaction may be allowed in some other embodiments of the present invention. FIG. 4 is a timing diagram illustrating a synchronization handshaking between a PSM 221-224 and a function unit 120, which is discussed in detail below.

First, the function unit 120 sends the transaction to the PSM by register programming. Next, the function unit 120 executes a standby instruction or a standby command to enter a standby state. In this example, the function unit 120 may be a CPU executing a software application which includes the standby instruction. The function unit 120 executes the standby instruction or command when the function unit 120 needs to synchronize with a PSM according to the operation of the transaction. The function unit 120 stops its normal operations by entering the standby state after completing all outstanding operations related to external interfaces such as memory read/write operations. Next, the function unit 120 asserts a fu_stdby signal for informing the PSM of the readiness of the function unit 120 for scaling of its operating frequency, operating voltage, or both. In the standby state, activities of the function unit 120 is minimized and the function unit 120 is insensitive to changes of power scaling factors such as operating voltage or operating frequency provided by the PDEs. The function unit 120 is then waiting for a response signal from the PSM to leave the standby state and then resume its normal operation.

When the assertion of the fu_stdby signal is observed by the PSM, the PSM starts changing the output of the PDEs by changing control signals or parameters transmitted from the PDE-dependent logic circuit 330 to the PDEs. The PSM asserts a wakeup_ok signal when the scaled frequency and/or voltage provided by the PDEs are stable enough for the normal operation of the function unit 120. When the function unit 120 observes the assertion of the wakeup_ok signal, the function unit 120 resumes its normal operation and de-asserts the fu_stdby signal. When the PSM observes the de-assertion of the fu_stdby signal, the PSM de-asserts the wakeup_ok signal.

Figure 5:
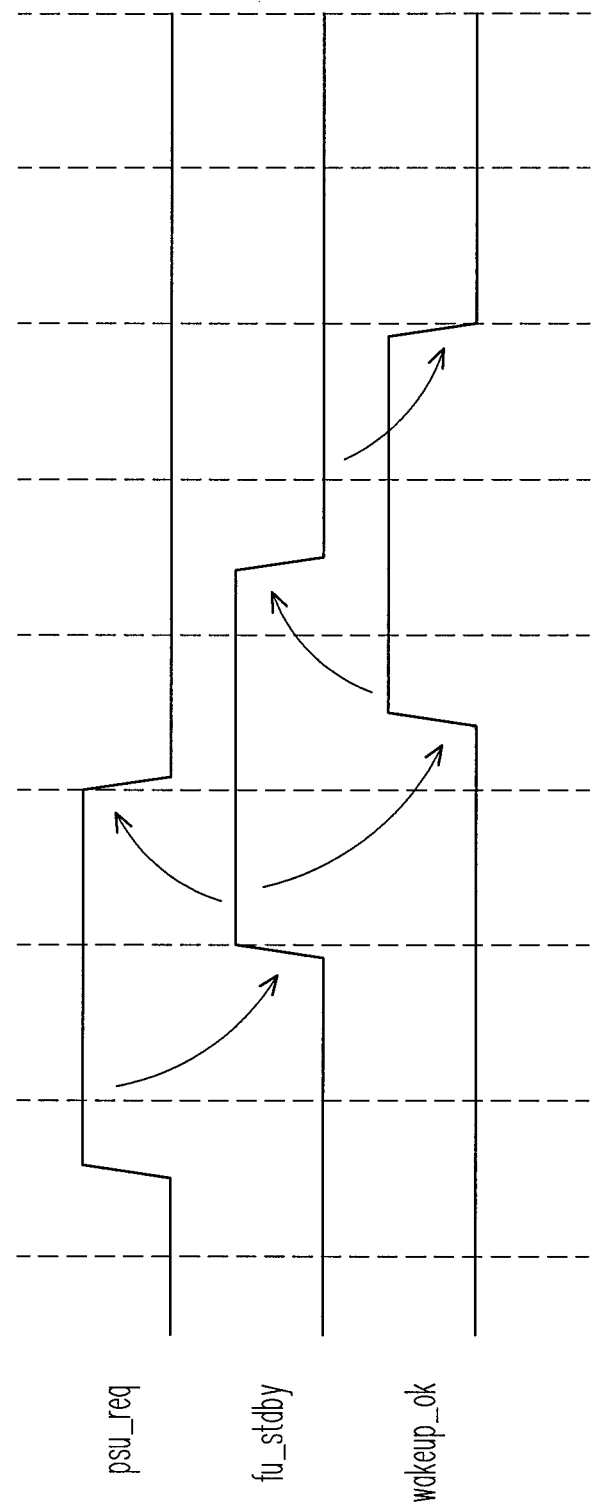
FIG. 5 is a timing diagram illustrating another synchronization handshaking between a power scaling module in FIG. 2 and a function unit in FIG. 1.

FIG. 5 is a timing diagram illustrating another synchronization handshaking between a PSM and a function unit 120. In FIG. 4, the function unit 120 initiates the synchronization handshaking. In FIG. 5, the PSM initiates the synchronization handshaking. First, the PSM asserts a request signal "psu_req" to a function unit 120 to request for synchronization. The function unit 120 then responds just like when it executes the "standby" instruction or command by itself. When the PSM observes the assertion of the fu_stdby signal, the PSM de-asserts the psu_req signal and then start changing the output of the PDEs. The rest of the synchronization handshaking in FIG. 5 is the same as its counterpart in FIG. 4.

The synchronization instruction in a power scaling transaction may specify the required synchronization handshaking between two or more PSMs in the PSU 110. A PSM may synchronize with the other PSMs right before one or more of the following three moments. (1) Adjusting the output of the PDEs 130 through the power control interfaces. (2) Assertion of the psu_req signal in FIG. 5. (3) Assertion of the wakeup_ok signal in FIG. 4 and FIG. 5. The PSM in FIG. 5 starts the synchronization handshaking with the function unit 120 by asserting the psu_req signal and finishes the synchronization handshaking with the function unit 120 by asserting the wakeup_ok signal. In other words, a PSM may perform a synchronization handshaking with one or more of the other PSMs right before the particular PSM changes the output of the PDEs 130, right before the particular PSM performs another synchronization handshaking with the function unit 120, and/or right before the particular PSM finishes the synchronization handshaking with the function unit 120.

The synchronization instruction may specify the moments of the required synchronization handshaking. The synchronization instruction may also specify which PSMs are involved for the required synchronization handshaking. Alternatively, the synchronization choices of a PSM against other PSMs may be predetermined by hardware implementation. For each required synchronization handshaking specified by the synchronization instruction, a complete cycle of synchronization protocol has to be performed. In this embodiment, a PSM performs synchronization handshaking with another PSM at most once for each of the aforementioned three moments during a power scaling transaction. In other words, a PSM may perform synchronization handshaking with another PSM at most three times during a power scaling transaction. More such synchronization handshaking during a transaction may be allowed in some other embodiments of the present invention.

Figure 6:
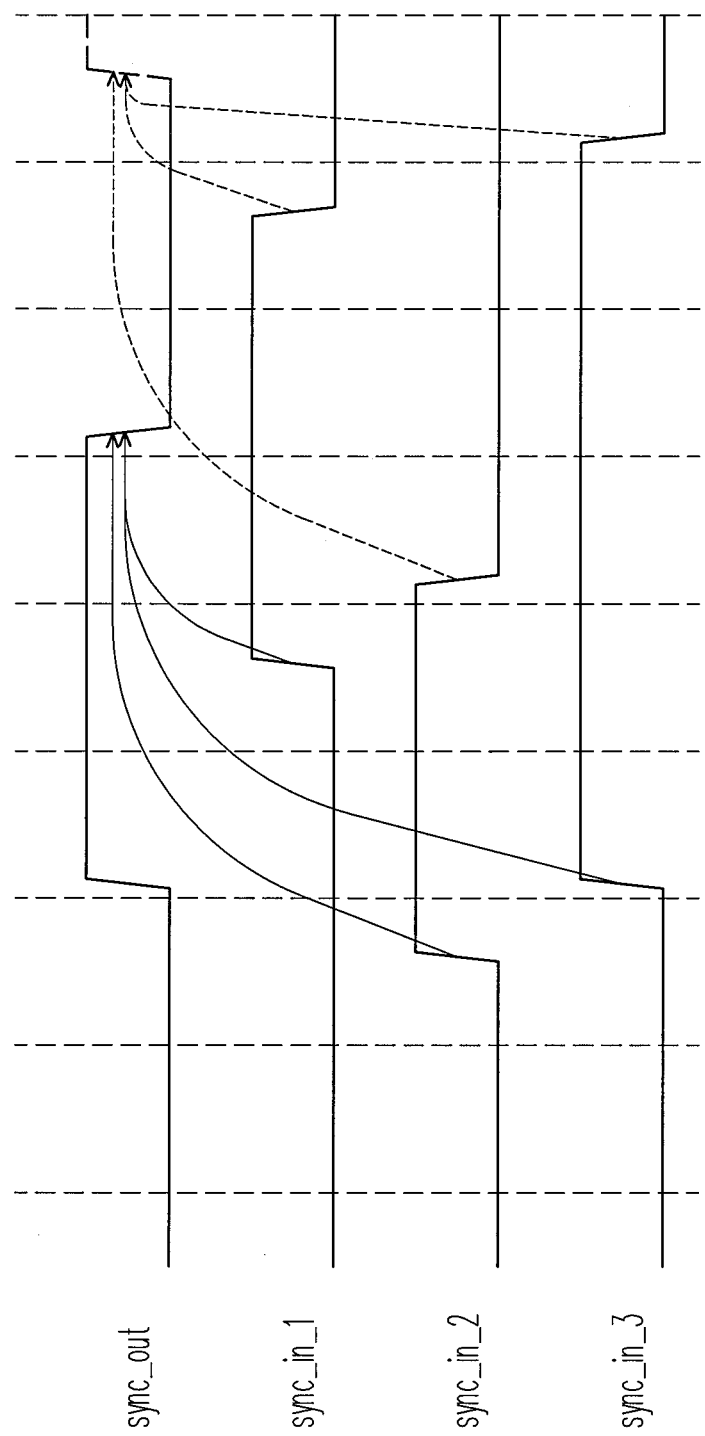
FIG. 6 is a timing diagram illustrating a synchronization handshaking between two power scaling modules in FIG. 2.

FIG. 6 illustrates an example of a complete cycle of synchronization protocol performed by the PSMs 221-224 of the PSU 110. In this example, each PSM issues one sync_out signal and receives one or more sync_in signals. Each sync_in signal is corresponding to a peer PSM involved in the synchronization handshaking. A PSM may assert its sync_out signal to request for or respond to its next synchronization handshaking as long as de-assertions of all sync_in signals asserted for previous synchronizations, with which this PSM might or might not involve, have been observed. When the assertions of the sync_out signal and one of the sync_in signals required by the synchronization instruction are observed by a PSM, the PSM considers the synchronization is done with the PSM corresponding to the asserted sync_in signal.

After a PSM has observed the completions of all required synchronizations with the involved sync_in signals, it may de-assert its sync_out signal and continue the current transaction, as shown by the solid arrows in FIG. 6. The PSM may not re-assert its sync_out signal until de-assertions of all sync_in signals that had been asserted for previous synchronizations, with which this PSM might or might not involve, have been observed. As shown by the dotted arrows in FIG. 6, this particular PSM begins its next synchronization handshaking by re-asserting its sync_out signal after all the three sync_in signals are de-asserted.

The signal waveforms in FIG. 6 are just one exemplary case. The PSM synchronization protocol in this embodiment allows the sync_in signal to be asserted before or after the associated sync_out signal for a synchronization handshaking.

Figure 7:
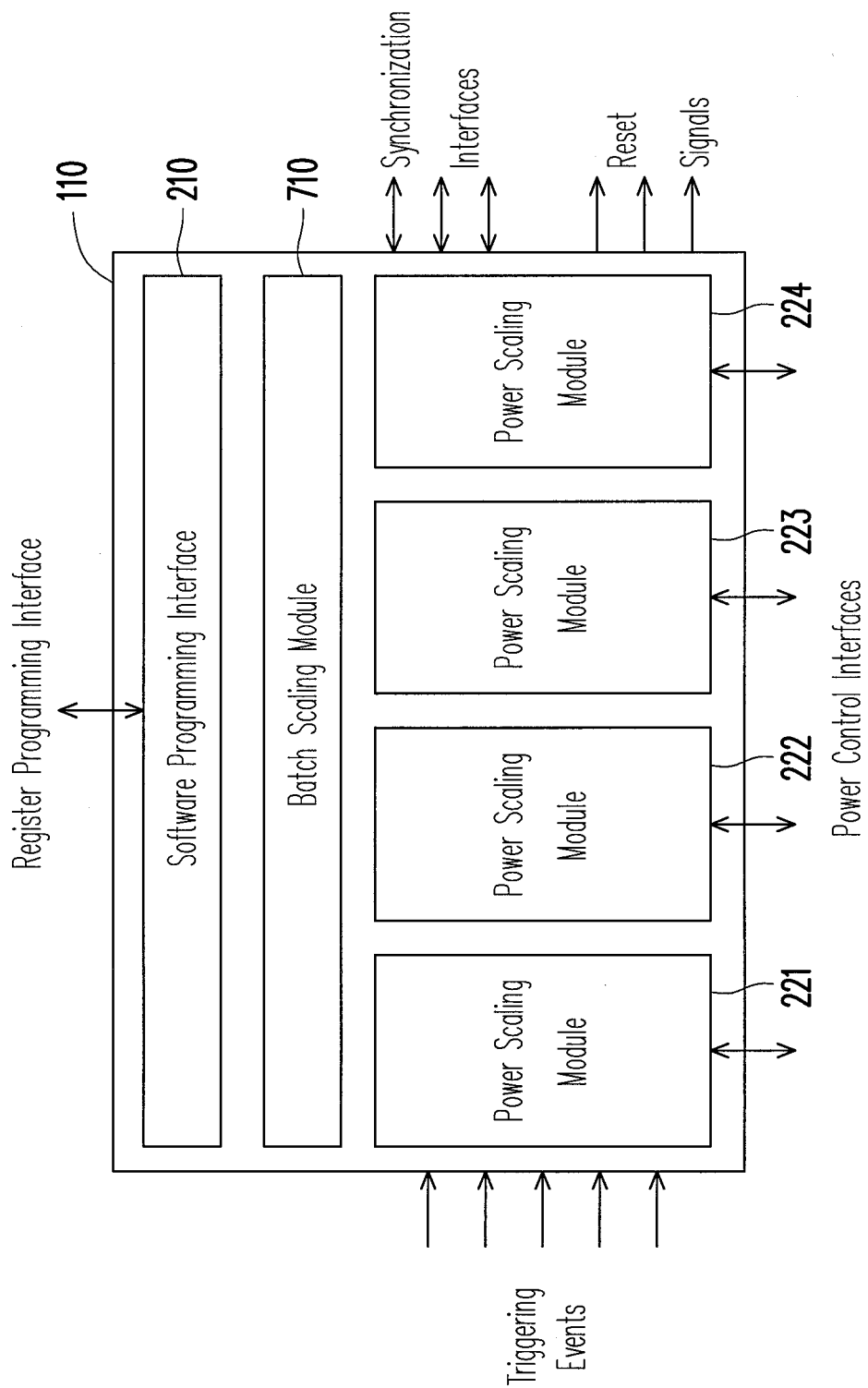
FIG. 7 is a block diagram showing the power scaling unit according to another embodiment of the present invention.

FIG. 7 is a block diagram showing the PSU 110 according to another embodiment of the present invention. The PSU 110 in FIG. 7 further includes a batch scaling module (BSM) 710. The BSM 710 controls the performing of sequential transaction batches and parallel transaction batches in the PSU 110. A sequential transaction batch includes multiple power scaling transactions. Each transaction in a sequential transaction batch is performed by a different PSM 221-224 of the PSU 110 and the transactions are performed one by one according to a sequence specified in the chaining information of the sequential transaction batch. A parallel transaction batch also includes multiple power scaling transactions and each transaction is performed by a different PSM 221-224 of the PSU 110. However, the transactions in a parallel transaction batch are performed by the PSMs 221-224 in parallel.

Regarding the sequential transaction batch, the chaining information may be programmed through the SPI 210. The chaining information may be stored in the BSM 710 or in the involved PSMs. The chaining information links the involved PSMs in the aforementioned sequence of transaction execution. The chaining information may indicate which PSM is the first one in the sequence and which PSM is the last one in the sequence. The chaining information may also indicate the previous PSM and the next PSM of each PSM in the sequence. When the chaining information is stored in the PSMs, there must be signal exchange between the PSMs and the BSM 710 to inform the BSM 710 of the sequence.

Either the setting of chaining information or a separate programmable bit in the programmable registers 310 of each PSM may be used to indicate that the transaction received by the PSM is not to be performed until the previous PSM in the sequence completes its transaction. An additional sequential batch command may be implemented in the BSM 710 to initiate a sequential transaction batch. Alternatively, the programming of the transaction of the first PSM in the sequence may initiate the sequential transaction batch. In the latter case, the transaction of the first PSM should be programmed last in the sequential transaction batch.

After the sequential transaction batch is initiated, the BSM 710 controls the progress of the sequence. The BSM 710 monitors the state of each PSM in the sequence. When the current PSM finishes its transaction, the BSM 710 sends a notification signal to the next PSM in the sequence to trigger the next PSM to perform its transaction. Consequently, the PSMs perform their transactions according to the sequence defined in the chaining information of the sequential transaction batch.

Regarding the parallel transaction batch, the parallel transaction batch includes corresponding bundling information which specifies which PSMs are going to perform the transactions of the parallel transaction batch. The bundling information may be programmed through the SPI 210. The bundling information may be stored in the BSM 710 or in the involved PSMs. When the bundling information is stored in the PSMs, there must be signal exchange between the PSMs and the BSM 710 to inform the BSM 710 of the PSMs involved in the parallel transaction batch.

Either the setting of bundling information or a separate programmable bit in the programmable registers 310 of each PSM may be used to indicate the transaction assigned to each PSM is not to be performed until a notification signal from the BSM 710 is observed. The aforementioned notification signal is triggered by an additional parallel batch command implemented in the BSM 710. While performing transactions in parallel, PSMs in a parallel transaction batch may also perform synchronization handshaking with each other.

The BSM 710 may support more complex transaction batches. For example, a transaction in a sequential transaction batch may be a parallel transaction batch. A transaction in a parallel transaction batch may be a sequential transaction batch. In other words, a sequential transaction batch may include one or more parallel transaction batches and a parallel transaction batch may include one or more sequential transaction batches. In this way, the BSM 710 may support a complex combination of sequential transaction batches and parallel transaction batches.

The PSU in the above embodiments of the present invention includes a plurality of PSMs. Each PSM may receive power scaling transactions through the SPI of the PSU. By performing the transactions, each PSM controls the output of one or more PDEs of the electronic system. The PSU is a standalone unit separate from the function units. Therefore, the power scaling performed by the PSU is atomic in the view of the function units. In summary, the above embodiments of the present invention provide a scalable, atomic and system-wide power scaling scheme.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power scaling unit (PSU) of an electronic system, comprising:
a software programming interface (SPI) for receiving a transaction through software programming; and
a power scaling module (PSM) for receiving the transaction from the SPI and controlling a power driving element (PDE) of the electronic system to change an output of the PDE provided to a function unit of the electronic system according to the transaction, wherein the output of the PDE is an operating voltage or an operating clock signal of the function unit; the transaction comprises a command defining an operation, a parameter used by the operation, and an event mask specifying an event which triggers the operation; when the command defines a power-down operation, the PSM turns off the output of the PDE and enters an off state, the event triggers the PSM to wake up out of the off state and turns on the output of the PDE according to the parameter; when the command defines an instant scaling operation, the PSM changes the operating voltage or a frequency of the operating clock signal according to the parameter, wherein the transaction further comprises a first synchronization instruction; the first synchronization instruction specifies a first synchronization handshaking between the PSM and the function unit during the operation defined by the command; during the first synchronization handshaking, the function unit enters a standby state, the PSM changes the output of the PDE, and then the function unit resumes normal operation; the function unit is insensitive to the change of the output of the PDE in the standby state.

2. The PSU of claim 1, wherein the PSM comprises:
a plurality of programmable registers coupled to the SPI for storing the command, the parameter, and the event mask;
a PDE-independent logic circuit coupled to the programmable registers for performing the operation defined by the command according to the parameter and receiving the event; and
a PDE-dependent logic circuit coupled to the PDE-independent logic circuit for generating signals to control the PDE.

3. The PSU of claim 1, wherein when the command defines an event-driven scaling operation, the PSM waits for the event and then changes the operating voltage or the frequency of the operating clock signal according to the parameter.

4. The PSU of claim 1, wherein, according to the parameter, the PSM resets the function unit after the PSM changes the output of the PDE.

5. The PSU of claim 1, wherein the PSU further comprises another PSM and the transaction further comprises a second synchronization instruction; the second synchronization instruction specifies a second synchronization handshaking between the PSM and the another PSM during the operation defined by the command; the PSM and the another PSM perform the second synchronization handshaking right before the PSM changes the output of the PDE, right before the PSM performs the first synchronization handshaking with the function unit, and/or right before the PSM finishes the first synchronization handshaking.

6. The PSU of claim 1, wherein when the PSM is in the off state, a non-maskable power-on event triggers the PSM to wake up out of the off state and turns on the output of the PDE according to a predetermined parameter.

7. The PSU of claim 1, wherein a non-maskable power failure event triggers the PSM to change the output of the PDE according to a predetermined parameter regardless of the current state of the PSM.

8. The PSU of claim 1, wherein the PSU comprises a plurality of PSMs and further comprises a batch scaling module (BSM) for controlling the performing of a sequential transaction batch or a parallel transaction batch; the sequential transaction batch comprises a plurality of transactions to be performed by the PSMs sequentially; the parallel transaction batch comprises a plurality of transactions to be performed by the PSMs in parallel; the BSM triggers each of the PSMs to perform the corresponding transaction according to a sequence specified in a chaining information of the sequential transaction batch; the chaining information is received through the SPI and is stored in either the BSM or the PSMs.

9. The PSU of claim 8, wherein one of the transactions of the sequential transaction batch is another parallel transaction batch.

10. The PSU of claim 8, wherein one of the transactions of the parallel transaction batch is another sequential transaction batch.

11. A power scaling module (PSM) of an electronic system, comprising:
a plurality of programmable registers for storing a command, a parameter, and an event mask of a transaction received through software programming;
a PDE-independent logic circuit coupled to the programmable registers for controlling a power driving element (PDE) of the electronic system to change an output of the PDE provided to a function unit of the electronic system according to the transaction, wherein the output of the PDE is an operating voltage or an operating clock signal of the function unit; the command defines an operation; the parameter is used by the operation; the event mask specifies an event which triggers the operation; when the command defines a power-down operation, the PDE-independent logic circuit turns off the output of the PDE and enters an off state, the event triggers the PDE-independent logic circuit to wake up out of the off state and turns on the output of the PDE according to the parameter; when the command defines an instant scaling operation, the PDE-independent logic circuit changes the operating voltage or a frequency of the operating clock signal according to the parameter; and
a PDE-dependent logic circuit coupled to the PDE-independent logic circuit for generating signals to control the PDE, wherein the transaction further comprises a first synchronization instruction; the first synchronization instruction specifies a first synchronization handshaking between the PSM and the function unit during the operation defined by the command; during the first synchronization handshaking, the function unit enters a standby state, the PSM changes the output of the PDE, and then the function unit resumes normal operation; the function unit is insensitive to the change of the output of the PDE in the standby state.

12. The PSM of claim 11, wherein when the command defines an event-driven scaling operation, the PDE-independent logic circuit waits for the event and then changes the operating voltage or the frequency of the operating clock signal according to the parameter.

13. The PSM of claim 11, wherein, according to the parameter, the PDE-independent logic circuit resets the function unit after the PDE-independent logic circuit changes the output of the PDE.

14. The PSM of claim 11, wherein the transaction further comprises a second synchronization instruction; the second synchronization instruction specifies a second synchronization handshaking between the PSM and another PSM during the operation defined by the command; the PSM and the another PSM perform the second synchronization handshaking right before the PSM changes the output of the PDE, right before the PSM performs the first synchronization handshaking with the function unit, and/or right before the PSM finishes the first synchronization handshaking.

15. The PSM of claim 11, wherein when the PSM is in the off state, a non-maskable power-on event triggers the PSM to wake up out of the off state and turns on the output of the PDE according to a predetermined parameter.

16. The PSM of claim 11, wherein a non-maskable power failure event triggers the PSM to change the output of the PDE according to a predeteimined parameter regardless of the current state of the PSM.

* * * * *